(12) United States Patent
Grapov et al.

(10) Patent No.: US 7,794,159 B2
(45) Date of Patent: Sep. 14, 2010

(54) SEALED BEAM COUPLER FOR AN ISOLATED ENVIRONMENT

(76) Inventors: Yuri Grapov, 71 School Rd., Sutton, MA (US) 01950; William D. Jones, 25 L'Herault Dr., Oxford, MA (US) 01540; Michael M. DiGiantommaso, 50 Old Webster Rd., Oxford, MA (US) 01540

( * ) Notice: Subject to any disclaimer, the term of this patent is extended or adjusted under 35 U.S.C. 154(b) by 0 days.

(21) Appl. No.: 12/396,536

(22) Filed: Mar. 3, 2009

(65) Prior Publication Data
US 2010/0166366 A1 Jul. 1, 2010

Related U.S. Application Data

(63) Continuation-in-part of application No. 12/319,070, filed on Dec. 31, 2008.

(51) Int. Cl.
*G02B 6/36* (2006.01)
*G02B 6/12* (2006.01)
*G02B 6/42* (2006.01)
*G02B 6/00* (2006.01)
*H01S 3/00* (2006.01)
*H01S 3/08* (2006.01)

(52) U.S. Cl. .............................. 385/94; 385/14; 385/31; 385/32; 385/33; 385/34; 385/39; 385/47; 385/88; 385/92; 385/93; 385/134; 385/135; 385/136; 385/137; 385/138; 385/139; 385/147; 372/6; 372/92; 372/98; 372/108

(58) Field of Classification Search ............... 385/14, 385/31, 33, 34, 39, 47, 88, 92, 93, 94, 134, 385/136, 137, 138, 139, 147; 372/6, 92, 372/98, 108, 703
See application file for complete search history.

(56) References Cited

U.S. PATENT DOCUMENTS

| | | | | |
|---|---|---|---|---|
| 5,039,193 | A | * | 8/1991 | Snow et al. ................... 385/25 |
| 2004/0146252 | A1 | * | 7/2004 | Healy et al. .................. 385/88 |
| 2006/0034571 | A1 | * | 2/2006 | Nagano et al. ................ 385/94 |

* cited by examiner

*Primary Examiner*—Charlie Peng
*Assistant Examiner*—Hung Lam
(74) *Attorney, Agent, or Firm*—Photonics IPG Corporation

(57) ABSTRACT

A beam coupler assembly for a fiber laser is disclosed. The assembly includes a housing having a sidewall with an interior surface, an exterior surface, a first end and a second end. A first seal extending from the interior surface of the tubular housing and dividing the housing into a first section and a second section is also provided. The first section and second section are environmentally isolated from one another. However, the first seal is substantially optically neutral. An input collimator unit received within the first end of the sidewall of the housing and into the first section and is releasably coupled thereto. An output collimator unit received within the second end of the sidewall of the housing and into the second section and is also releasably coupled thereto.

15 Claims, 6 Drawing Sheets

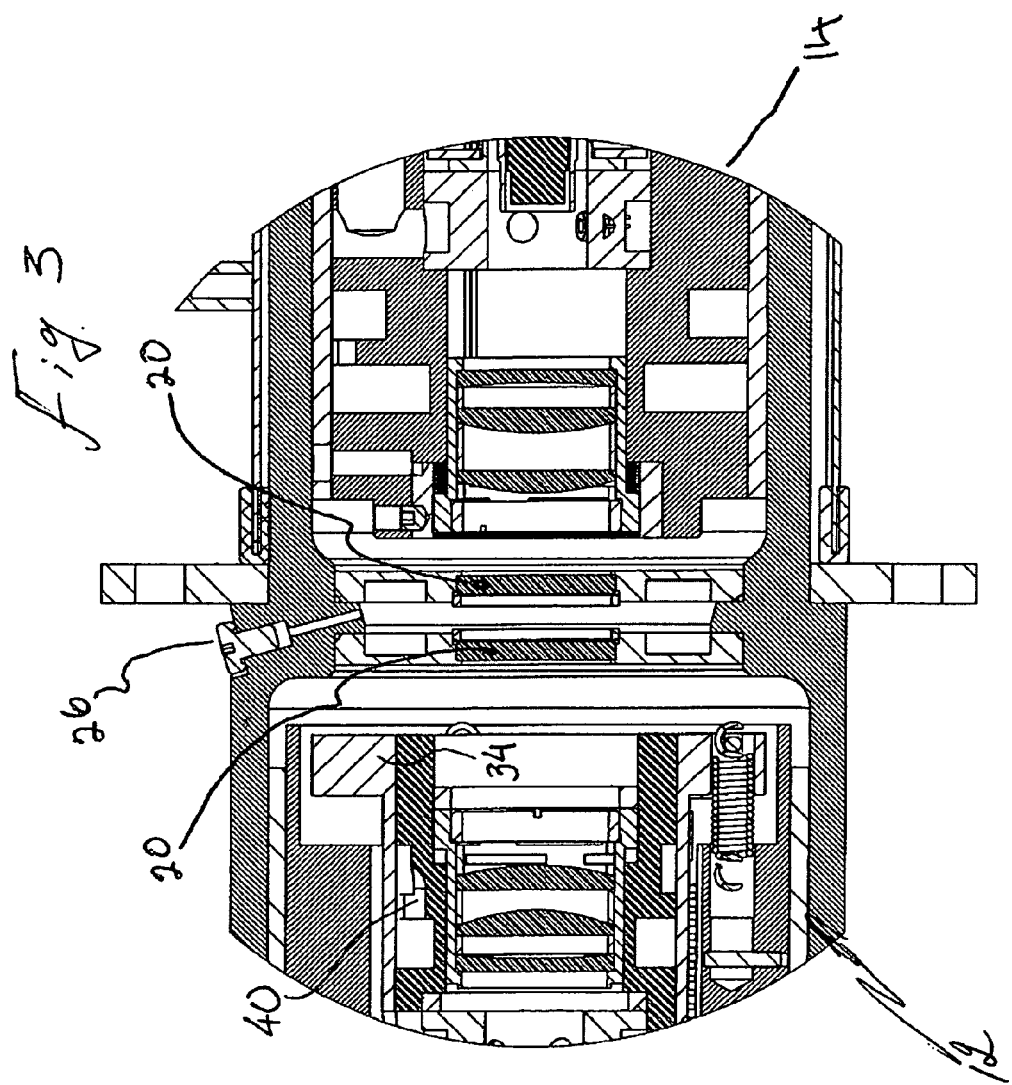

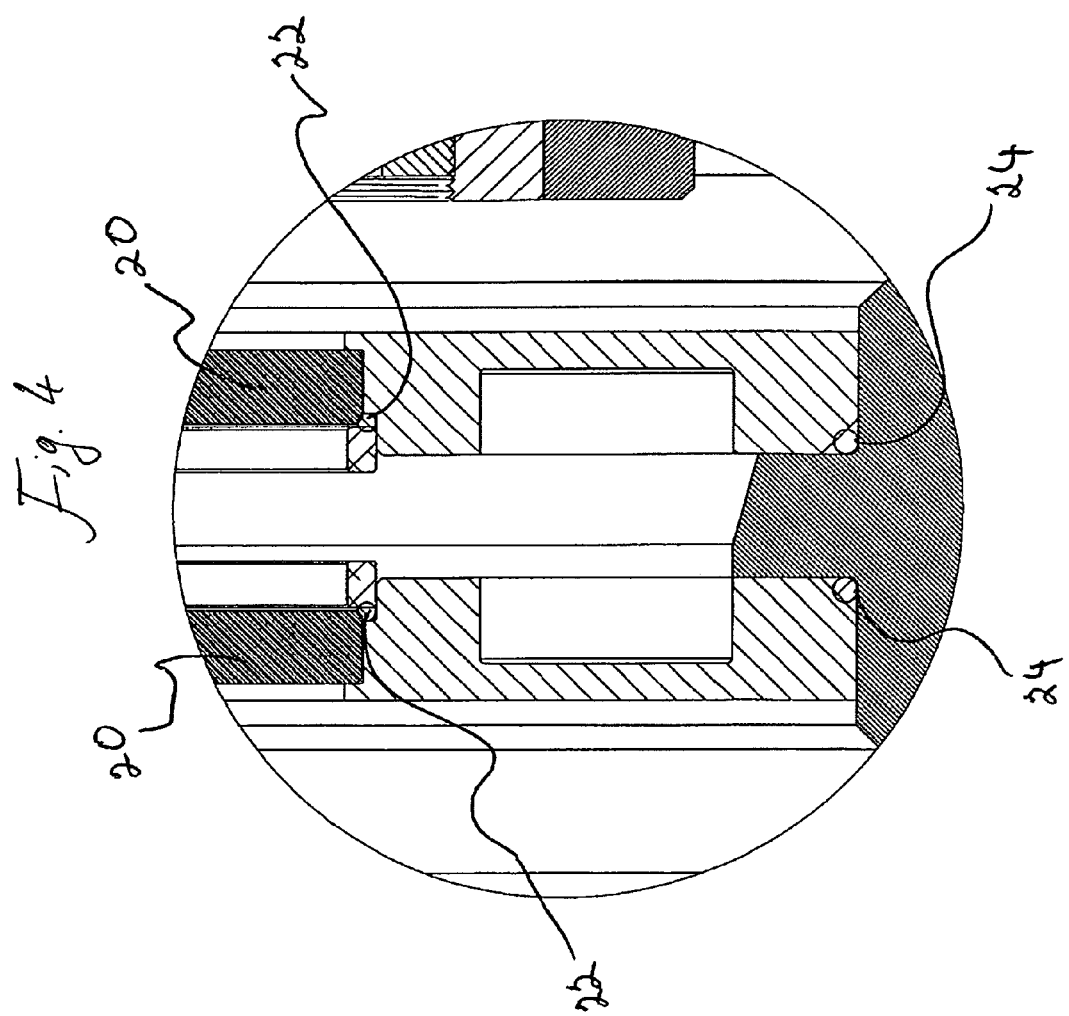

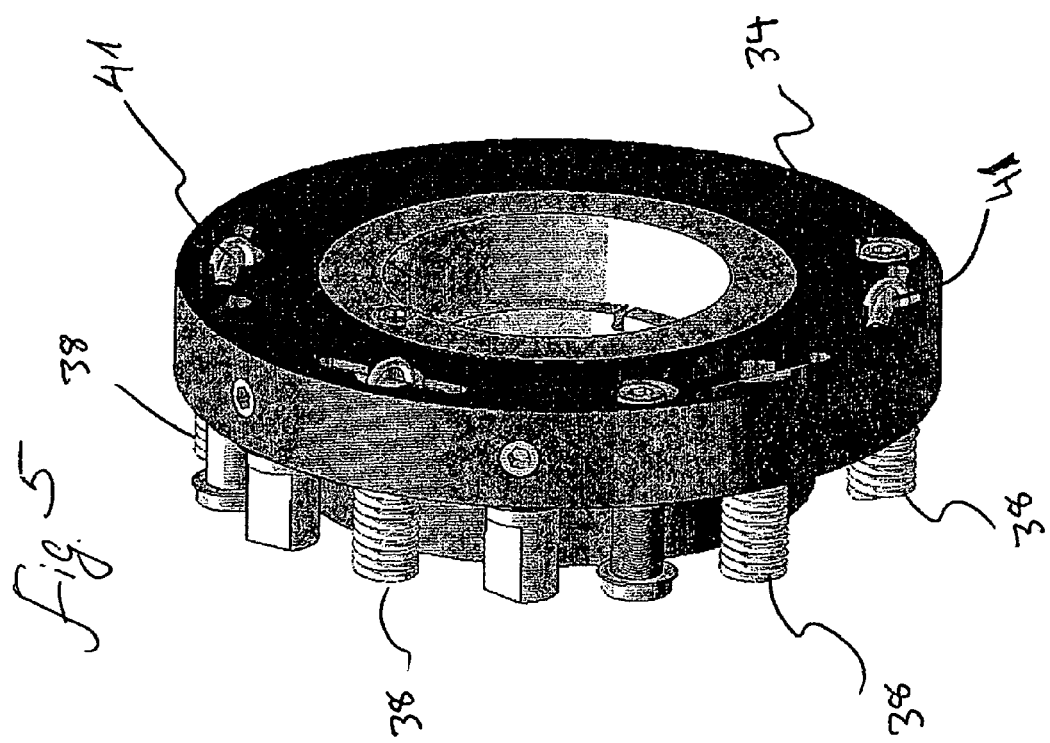

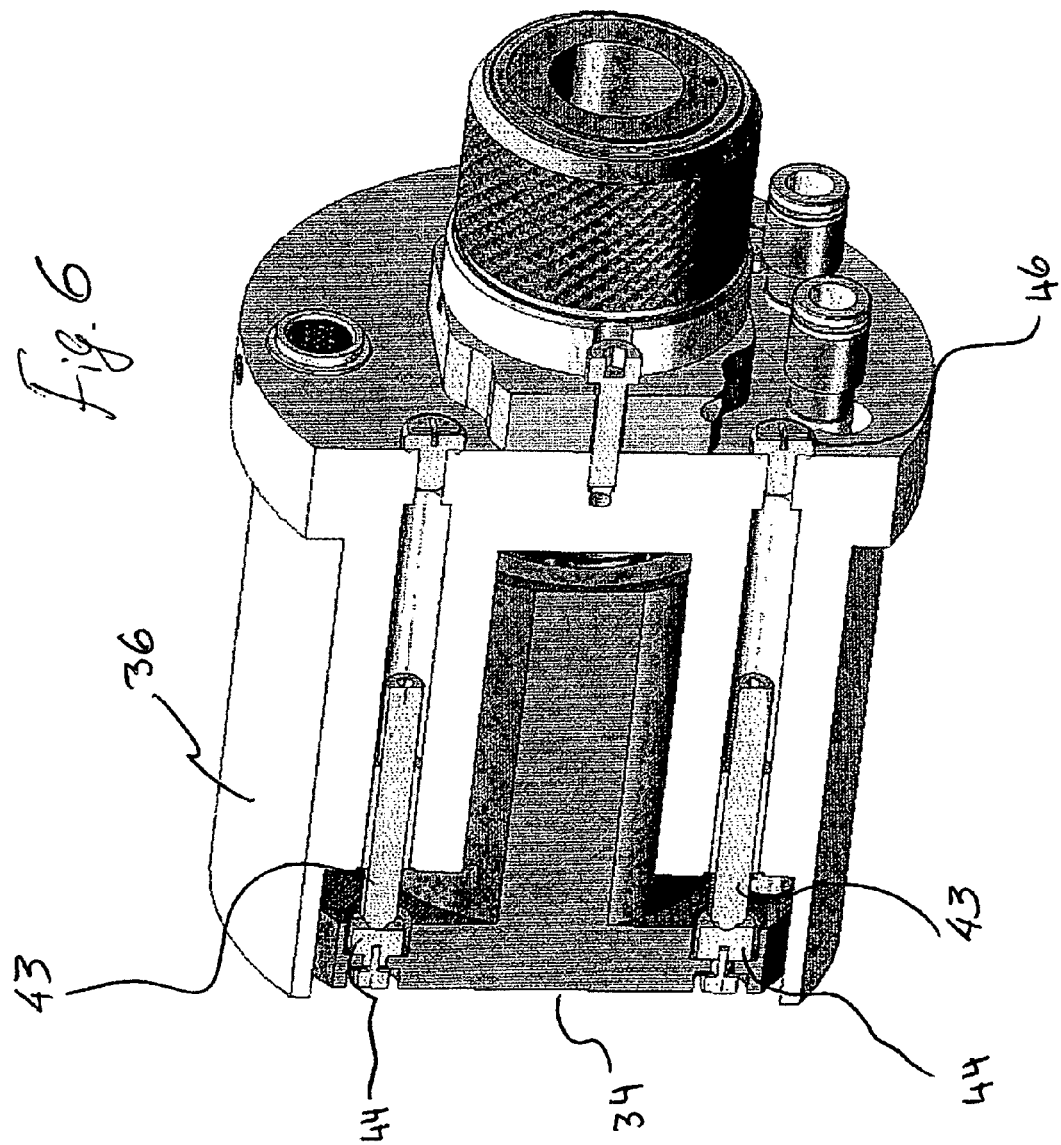

SEALED BEAM COUPLER FOR AN ISOLATED ENVIRONMENT

CROSS-REFERENCE TO RELATED APPLICATION

The present patent document is a continuation-in-part of earlier filed U.S. application Ser. No. 12/319,070, filed Dec. 31, 2008, the contents of which are incorporated herein by reference.

BACKGROUND OF THE INVENTION

1. Field of the Invention

The present patent document relates generally to lasers and more specifically to a beam coupler with a sealed housing configured for use in an isolated environment that may contain hazardous and/or contaminated materials.

2. Background of the Related Art

Beam couplers are often used in a health-hazardous environment, such as radiation-contaminated facilities. In case of malfunctioning of a beam coupler, the procedure established for its repairing is time-consuming and complicated. Furthermore, it is important to prevent penetration of external contaminant into the optical cavity since the optical components are sensitive to any changes within the cavity.

A need, therefore, exists for a modular beam coupler configured so that any malfunctioning part of the beam coupler can be removed, replaced or repaired in a simple manner.

A further need exists for a beam coupler configured with a contaminant-proof structure.

A further need exists for a beam coupler configured with a contaminant-proof structure configured with a replaceable laser delivery energy component which requires the optical alignment with the rest of the structure outside the contaminated area.

SUMMARY OF THE INVENTION

The present invention solves the problems of the prior art by providing a coupler assembly for a fiber laser for an isolated environment that is sealed. In particular the coupler assembly includes preferably, but not necessarily, a tubular housing having a sidewall with an interior surface, an exterior surface, a first end and a second end. A first seal extends from the interior surface of the tubular housing and divides the tubular housing into a first section and a second section. Consequently, the first section and second section are environmentally isolated from one another. An input collimator unit received within the first end of the sidewall of the tubular housing and into the first section and is releasably coupled thereto. An output collimator unit received within the second end of the sidewall of the tubular housing and into the second section and is also releasably coupled thereto.

A flange extends from the exterior surface of the sidewall of the tubular housing and is configured and arranged to mount to an aperture on an exterior wall of the isolated environment. When mounted thereto, the output collimator unit is within the interior portion of the isolated environment and the input collimator unit is outside of the isolated environment.

In this manner, the beam coupler of the present invention prevents excursion of material through the coupler from the isolated environment that contains hazardous or contaminated materials. Furthermore, the beam coupler allows alignment from outside the contaminated area.

BRIEF DESCRIPTION OF THE DRAWINGS

These and other features, aspects, and advantages of the present invention will become better understood with reference to the following description, appended claims, and accompanying drawings where:

FIG. 3 is a cross section of mid-portion of the coupler assembly of FIG. 2;

FIG. 4 is a close-up view of the mid-portion of the coupler assembly of FIG. 2;

FIG. 5 is a rear face view of the input collimator unit of the coupler assembly.

FIG. 6 is a sectional view of the input collimator unit of the coupler assembly.

DESCRIPTION OF THE PREFERRED EMBODIMENT

Figure 1:
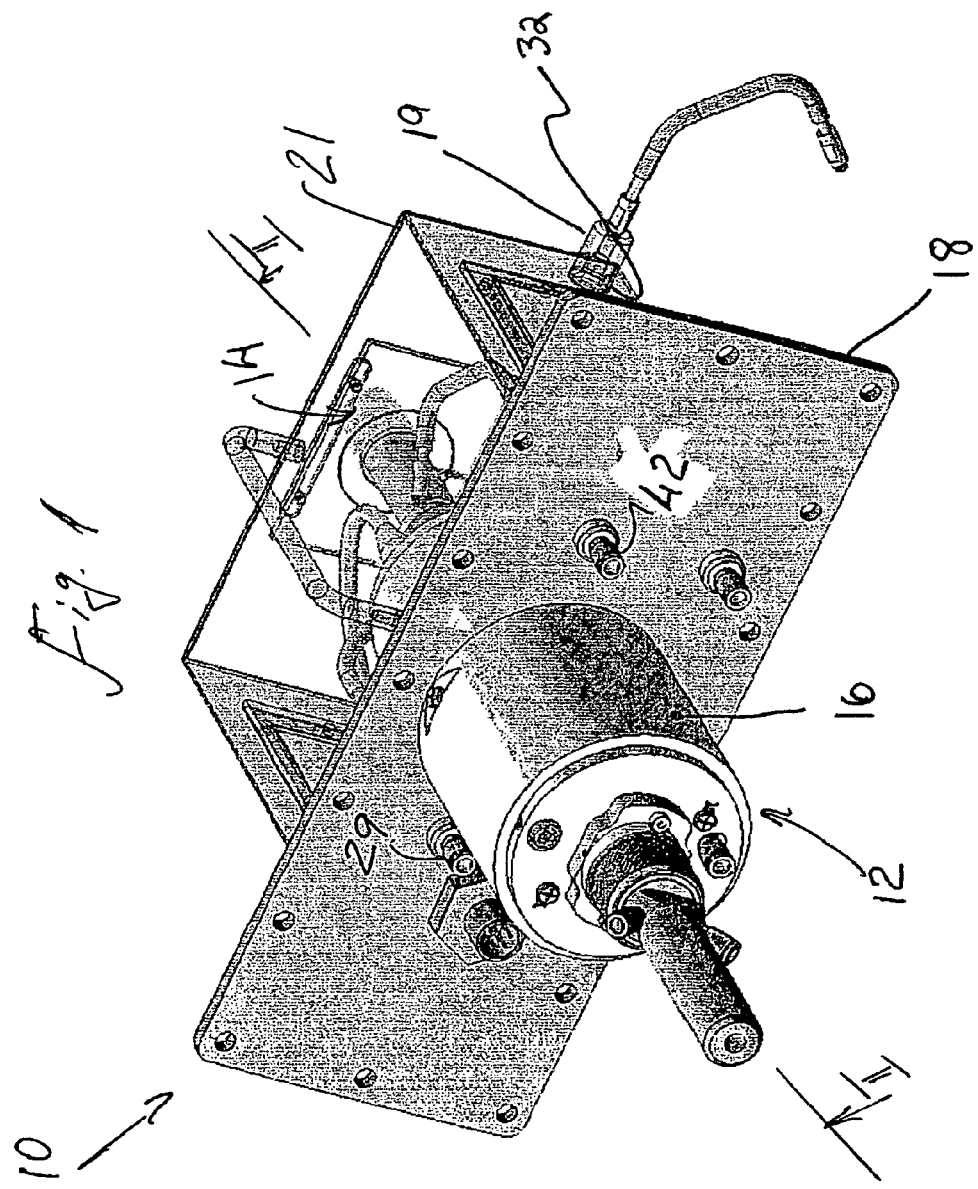
FIG. 1 is a front perspective view of the preferred embodiment of the coupler assembly of the present invention.
Figure 2:
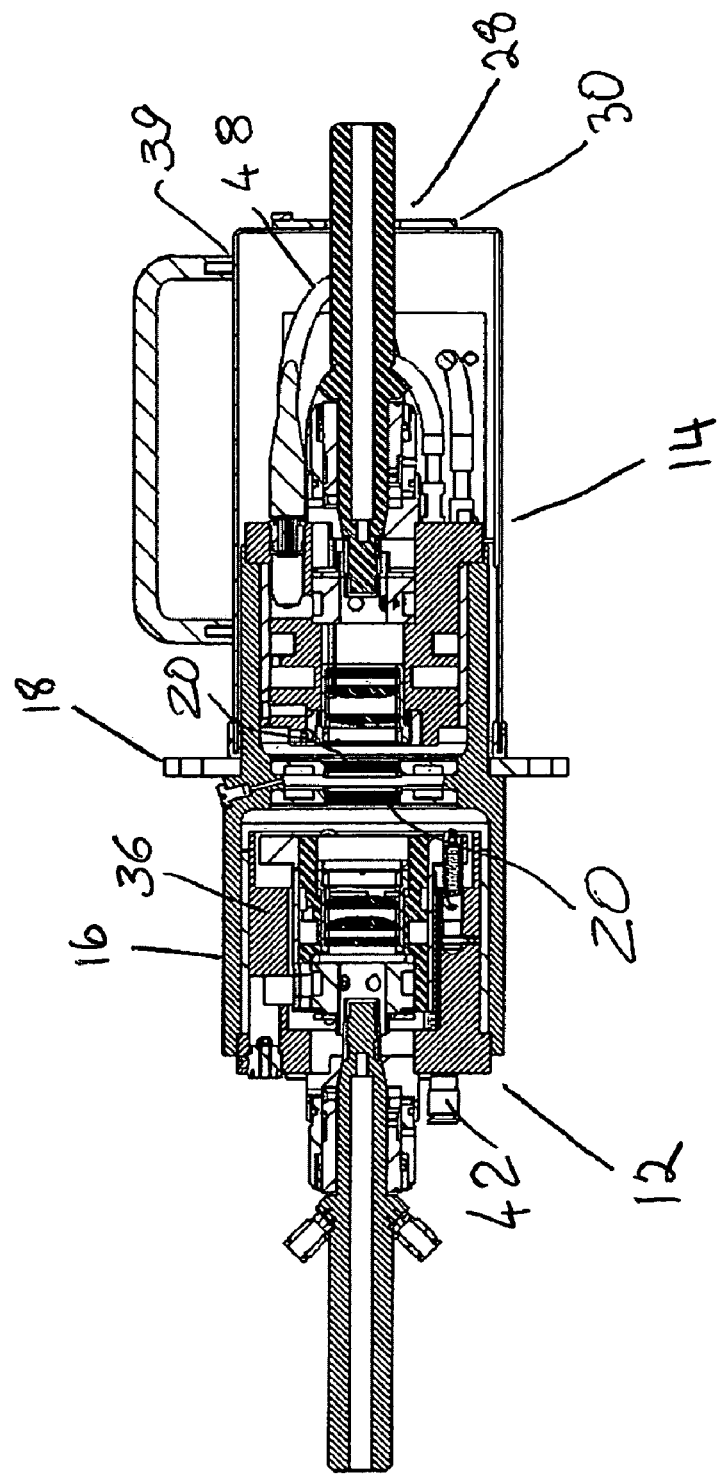
FIG. 2 is a side cross-section view through line II-II of FIG. 1.

Referring to FIG. 1, the beam coupler 10 includes input and output collimator modules 12, 14 respectively, which can be individually mounted/dismounted to and from an outer housing 16. This is particular significant when beam coupler 10 is used within a contaminated area. As illustrated in FIGS. 1 and 2, housing 16 includes a peripheral flange 18 which is mounted to a partition on the contaminated environment area so that output collimator module 14 is located inside the contaminated environment. When a need exists for removing, or replacing output collimator module 14, it is desirable that such a removal or repair be arranged without dismounting of the entire assembly so that contaminants will not flow outside the hazardous environment through beam coupler 10.

FIG. 2 illustrates one aspect of the present disclosure which relates to a structure reliably shielding the housing or optical cavity in general and, in particular, input collimator unit 12 when output unit 14 is removed from housing 16 by, for example, a robotic arm. This is attained by providing a midsection of housing 16 as a compartment configured to receive one or more flat windows 20 made from fused silica and coated with antireflective coating. The windows 20 are configured to prevent flow communication of contaminants towards input collimator unit 12 while allowing laser energy to pass through without reflecting or degrading energy source. The redundancy of windows 20 provides for an additional safety measure if one of windows 20 is damaged.

Referring to FIGS. 3 and 4, to further improve the impermeability of the housing cavity, flat windows 20 each have indium-made seals 22 hermetically coupling glass to metal and rubber seal 24 sealing metal to metal, as best seen in FIG. 4B. If one of the windows 20 and the seals 22, 24 is damaged, the other, redundant window 20 with respective seals 22 and 24 can fully isolate the input collimator from the hazardous environment. Furthermore, the other window 20 allows for replacement of damaged item without penetration of hazardous material into non-hazardous environment, regardless whether the damaged item is located in or outside the hazardous environment.

During the assembly of the disclosed coupler, the compartment with windows 20 is characterized by a certain pressure. Quite often, beam coupler 10 is used in environment having pressure different from that one inside the compartment. If the outside pressure is too high, for example, the geometry of windows 20 may be distorted. If windows 20 are not flat, obviously the light beam between collimator modules 12 and 14 can be distorted, since the windows would operate as lenses. Thus, according to a further aspect of the disclosure, to prevent such damage to the window's geometry, beam coupler 10 has an air-stabilizing means providing communication between the compartment and the environment. In one embodiment the air-stabilizing means is a set screw 26 (FIG. 3) that may be adjusted to equalize the pressure. In another embodiment (not shown) the air-stabilizing means may be a valve.

Turning back to FIGS. 1 and 2, in accordance with a further aspect, the output collimator module 16 is enclosed by a shroud 21 (FIG. 1), which is held in place to the flange via tapered pins and magnetic strips to permit easy removal of the shroud therefrom. The shroud 21 prevents contaminates from settling on the coupler assembly. The shroud includes a number of apertures therethrough.

A first aperture 28 (FIG. 2) is configured to allow the delivery fiber to extend therethrough with minimal binding. The first aperture includes flexible members 30 that hug the delivery fiber and restrict the ability of contaminants to penetrate to the interior of the shroud. However, the flexible members do not form an air-tight seal between the shroud and the delivery fiber.

The second aperture 39 (FIG. 2) is configured to allow a coolant tube therethrough to deliver coolant fluid to the work site and/or tool. A grommet holds the tube in place in the shroud. The coolant tube is connected to a quick-release connector, which may have a check-valve.

In accordance with a further aspect, the shroud will be under a positive pressure which exceeding atmospheric pressure via the third aperture 32 (FIG. 2). The higher inside pressure is an additional safety barrier preventing contaminants from penetrating inside the housing cavity. Inert gas pressure is supplied through a hose, which is connected to the shroud through a connector 19.

Referring again to FIGS. 2 and 3, a further feature of the present disclosure includes an X-Y-Z adjustment mechanism provided with a plurality of adjustment screws. In contrast to the technique of adjusting the position the output collimator unit 14, the adjustment mechanism of this disclosure provides adjustment of only input collimator unit 12 in order to facilitate alignment of the collimator units from the exterior of the contaminated environment, which will be further described below.

In particular, the input collimator unit 12 includes an outer housing 36 with a rear face and a sidewall forming a hollow interior. The rear face extends beyond the sidewall forming a lip with a shoulder. A fiber bayonet mount is secured to the front face of the outer housing. As will be further described below, an inner housing 34 is suspended within the interior of the outer housing.

The inner housing 34 further includes a central cavity with a restricted portion. The inner housing also includes a pair of fluid coolant chambers 40 (FIG. 3). These fluid coolant chambers are also space adjacent to the restricted portion of the central cavity, which also includes thinned wall segments to facilitate heat transfer thereto. The coolant chambers are in fluid connection to with fluid inlet connectors 42 via a bellows tubing. The bellows tubing includes a knurled section, a bellows section and a straight section, which permit the bellows tubing to flex or move as the inner housing is adjusted relative to the outer housing.

The inner housing 34 includes a detector unit and a lens assembly that are fit into opposite ends of the central cavity until they are seated against the shoulders of the restricted portion of the central cavity and locked in place.

Referring to FIGS. 3 and 5, the inner housing 34 (FIG. 3) includes an outer rim with a concentric ledge formed extending from the sidewall of the inner housing. As mentioned earlier, the inner housing is suspended within the outer housing 36 via a number of extension springs 38, best seen in FIG. 5. In a preferred embodiment, four springs 38 are provided. One end of each spring is secured via a dowel pin 41 to the inner housing through an aperture through the ledge and rim of the inner housing as shown in FIG. 5. Each dowel pin rests in a recess formed on the front face of the inner housing, opposite the ledge. The opposite end of the spring is secured via retaining clip within a slot formed on the interior of the outer housing. Each spring may freely extend outwardly or contract into its respective slot. In this manner, the interior housing is held and within the outer housing.

Referring back to FIG. 6, as mentioned earlier, a number of adjustment screws are provided to selectively move the inner housing relative to the outer housing. Specifically, each adjustment screw 43 is threaded into a bore formed through the outer housing from the rear face thereof. An access point is provided on the rear face of the outer housing to each bore, which permits a technician to insert a tool to adjust each adjustment screw 43. Each access point may be further enclosed via a cap to prevent grim and moisture from entering the bore. The adjust screws 43 may be threadably extended and retracted from the outer housing. Extending the adjust screws forces them outwardly towards the inner housing where the end of the screw will contact a hardened seat 44 on ledge of the rim of the inner housing. Continuing to extend the adjust screw causes the tip of the adjust screw to exert an outward force against the ledge of the rim thereby forcing the inner housing to tilt or pivot in that direction as the extension springs are stretched. By selectively extending or retracting each adjustment screw 43, the inner housing (and lens assembly contained therein) may be finely or minutely adjusted relative to the lens assembly of the opposing output collimator unit. In this manner, the collimator units 12, 14 may be optically aligned with one another.

Turning to FIG. 2, the output collimator unit 14 includes a housing with a front face, rear face and sidewall. The rear face extends outwardly beyond the sidewall forming a lip with a shoulder. The sidewall further includes two concentric spaced-apart coolant chambers which are interconnected via transfer zone.

Further connecting the coolant chambers together is a coolant tube 48, which extends out the front face of the housing and terminates in a fluid inlet connector. A secondary fluid inlet connector is also provided, which is also in fluid connection with the coolant chambers. During operation, coolant fluid is circulated through connector, fluid tube, coolant chambers, and fluid connector to regulate the operating temperature of the collimator unit 14, and specifically lens assembly, within acceptable tolerances.

The housing is press-fit into a jacket. The jacket abuts the shoulder on the lip of the housing and snugly encases the sidewall, thereby also enclosing the coolant chambers.

A central bore if formed through the rear face to the front face of the housing. The central bore includes a restricted portion near the center of the bore, which forms two shoulders at either end thereof where the bore widens. The restricted portion of the bore includes thinned wall segments adjacent to coolant chambers to facilitate heat transfer to the fluid coolant.

The detector holder is press-fit through the rear face of the housing and into the bore until it rests up against the shoulder. A fiber bayonet mount is coupled to the rear face of the housing and includes a fiber cavity configured to receive an optical fiber bayonet. The fiber cavity extends through the bayonet mount and is aligned with the detector holder where the end of the fiber is fixed within the central cavity.

A lens assembly is press-fit through the bore on the front face until it abuts the opposite shoulder of the restricted portion of the bore. The lens assembly includes several lenses and gratings configured and arranged to transmit the laser beam therethrough with minimal power loss, diffraction and reflection. An air gap lies between the lens assembly and the end of the detector holder through the central cavity and to the end of the fiber.

Because the output collimator unit 14 is on the interior of the hazardous or contaminated environment, special consideration must be given to circulating fluid coolant to the output collimator unit 14 and fiber bayonet of the delivery fiber. The flange 18 includes a number of connectors therethrough for circulating fluid coolant to the output collimator unit 14 and fiber bayonet via a number of fluid hoses. In this manner, fluid coolant is provided to the output collimator unit and fiber bayonet, yet the coolant remains isolated from the contaminated environment.

Also provided is an electrical connector 29 (FIG. 1) on the flange 18, which is connected to the output collimator unit 14 via an extension wire. In this manner, the detector unit of the output collimator unit 14 may be monitored.

Therefore, it can be seen that the present invention provides a unique solution to the problem of providing a beam couple that prevents excursion of material through the coupler from an isolated environment that may contain hazardous or contaminated materials.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A beam coupler assembly for a fiber laser, comprising:
   a housing having a sidewall with an interior surface, an exterior surface, a first end and a second end;
   a first seal extending from the interior surface of the housing and dividing the housing into a first section and a second section, the first section and second section being environmentally isolated from one another, the first seal being substantially optically neutral;
   an input collimator unit received within the first end of the sidewall of the housing and into the first section and releasably coupled thereto; and
   an output collimator unit received within the second end of the sidewall of the housing and into the second section and releasably coupled thereto;
   a flange extending from the exterior surface of the sidewall of the housing; and
   a shroud coupled to said flange and enclosing said output collimator unit, the shroud including a plurality of closable apertures therethrough.

2. The assembly of claim 1, further comprising a second seal adjacent to said first seal, the second seal providing a redundant seal to said first seal, the second seal being substantially optically neutral.

3. The assembly of claim 2, further comprising means for air pressure equalization between said first seal and said second seal.

4. The assembly of claim 3, wherein said means for air pressure equalization is a valve.

5. The assembly of claim 3, wherein said means for air pressure equalization is a set screw.

6. The assembly of claim 1, wherein said shroud is positively pressurized.

7. The assembly of claim 1, further comprising an alignment mechanism configured and arranged to optically align the input collimator unit and the output collimator unit about a common optical axis.

8. The assembly of claim 1, further comprising a plurality of connectors and tubes configured and arranged to circulate fluid coolant to and from said input collimator and said output collimator, respectively.

9. A beam coupler assembly for a fiber laser for an isolated environment having an exterior wall defining an interior portion and an exterior portion and an aperture therethrough, said coupler assembly comprising:
   a housing having a sidewall with an interior surface, an exterior surface, a first end and a second end;
   a first seal extending from the interior surface of the housing and dividing the housing into a first section and a second section, the first section and second section being environmentally isolated from one another, said first seal being substantially optically neutral;
   a second seal adjacent to said first seal, the second seal extending from the interior surface of the tubular housing and providing a redundant seal to environmentally isolate the first section from the second section, the second seal being substantially optically neutral;
   an input collimator unit received within the first end of the sidewall of the housing and into the first section and releasably coupled thereto;
   an output collimator unit received within the second end of the sidewall of the housing and into the second section and releasably coupled thereto;
   a flange extending from the exterior surface of the sidewall of the housing and configured and arranged to mount to the aperture on the exterior wall whereby the output collimator unit is within the interior portion of the isolated environment and the input collimator unit is within the exterior portion of the isolated environment, and
   a shroud coupled to said flange and enclosing said output collimator unit, the shroud including a plurality of closable apertures therethrough.

10. The assembly of claim 9, further comprising means for air pressure equalization between said first seal and said second seal.

11. The assembly of claim 10, wherein said means for air pressure equalization is a valve.

12. The assembly of claim 10, wherein said means for air pressure equalization is a set screw.

13. The assembly of claim 9, wherein said shroud is positively pressurized.

14. The assembly of claim 9, further comprising an alignment mechanism configured and arranged to optically align the input collimator unit and the output collimator unit about a common optical axis.

15. The assembly of claim 9, further comprising a plurality of connectors and tubes configured and arranged to circulate fluid coolant to and from said input collimator and said output collimator, respectively.

* * * * *